United States Patent
Veselov et al.

(10) Patent No.: US 7,580,703 B1
(45) Date of Patent: Aug. 25, 2009

(54) PROVISIONING TO CDC DEVICES

(75) Inventors: Pavel S. Veselov, San Jose, CA (US); Dianna L. Decristo, Venice, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 847 days.

(21) Appl. No.: 10/798,981

(22) Filed: Mar. 11, 2004
(Under 37 CFR 1.47)

(51) Int. Cl.
*H04M 3/42* (2006.01)
*H04M 3/00* (2006.01)
*H04W 4/00* (2006.01)
*G06F 9/45* (2006.01)
*G06F 9/445* (2006.01)

(52) U.S. Cl. .................. 455/414.1; 370/328; 455/418; 717/147; 717/174

(58) Field of Classification Search .............. 370/328; 455/414.1, 418; 717/147, 174
See application file for complete search history.

(56) References Cited

U.S. PATENT DOCUMENTS

| | | | | |
|---|---|---|---|---|
| 6,066,181 A | * | 5/2000 | DeMaster | 717/148 |
| 6,473,759 B1 | * | 10/2002 | Herrendoerfer et al. | 707/10 |
| 7,072,672 B1 | * | 7/2006 | Vanska et al. | 455/456.3 |
| 7,079,839 B1 | * | 7/2006 | Papineau | 455/418 |
| 7,092,703 B1 | * | 8/2006 | Papineau | 455/418 |
| 2002/0122055 A1 | * | 9/2002 | Parupudi et al. | 345/737 |
| 2003/0084165 A1 | * | 5/2003 | Kjellberg et al. | 709/227 |
| 2003/0196189 A1 | * | 10/2003 | Wang et al. | 717/124 |
| 2004/0034853 A1 | * | 2/2004 | Gibbons et al. | 717/174 |
| 2004/0267804 A1 | * | 12/2004 | Fresko et al. | 707/102 |
| 2005/0088983 A1 | * | 4/2005 | Wesslen et al. | 370/313 |

* cited by examiner

*Primary Examiner*—Lester Kincaid
*Assistant Examiner*—Nathan Mitchell
(74) *Attorney, Agent, or Firm*—Martine Penilla & Gencarella, LLP

(57) ABSTRACT

A method for delivering a non-MIDlet application to a device associated with a connected device configuration (CDC) through an over the air (OTA) mobile information device profile (MIDP) protocol is provided. The method initiates with prefixing an identifier for the non-MIDlet application, wherein the identifier is configured to imply a MIDlet application. The method includes requesting the non-MIDlet application and determining a type of the non-MIDlet application. Then, the non-MIDlet application is managed with an interface application associated with the type of the application. A system and device configured to download a non-MIDlet application through a mobile information device profile (MIDP) are provided.

18 Claims, 7 Drawing Sheets

PROVISIONING TO CDC DEVICES

CROSS REFERENCE TO RELATED APPLICATIONS

This application is related to U.S. patent application Ser. No. 10/600,281, filed Jun. 20, 2003, and entitled "Protocol Method for Provisioning Services," and U.S. patent application Ser. No. 10/600,119, filed Jun. 20, 2003, and entitled "Application Programming Interface for Provisional Services," each of which are incorporated herein by reference in their entirety for all purposes.

BACKGROUND OF THE INVENTION

1. Field of the Invention

This invention relates generally to computer networking, and more particularly to an apparatus and method for delivering services/application to a device.

2. Description of the Related Art

Current mobile computing environments allow computer users great variety in digital services, which can vary from device to device depending on the type of client device used and the needs of the user. Typically, mobile client devices obtain digital services via a provisioning server.

The Over the air (OTA) Mobile information device profile (MIDP) is currently configured to only provision MIDlets to Connected limited device configuration (CLDC)/MIDP devices. Thus, currently, use of the OTA/MIDP can not be used to send non-MIDlet applications, e.g., Xlets and applets, to Connected device configuration (CDC) devices associated with personal profile (PP) configuration. As the CDC devices become more popular, it would be useful to use the existing OTA/MIDP infrastructure to provision content to these devices.

In view of the foregoing, there is a need for a method and system capable of taking advantage of the OTA/MIDP for provisioning of non-MIDlet applications to CDC enabled devices.

SUMMARY OF THE INVENTION

Broadly speaking, the present invention fills these needs by providing a method and system that enables delivery of Xlets and applets through MDP OTA to a CDC enabled device. It should be appreciated that the present invention can be implemented in numerous ways, including as an apparatus, a system, a device, or a method. Several inventive embodiments of the present invention are described below.

In one embodiment, a method for delivering a non-MIDlet application to a device associated with a connected device configuration (CDC) through an over the air (OTA) mobile information device profile (MIDP) protocol is provided. The method initiates with prefixing an identifier for the non-MIDlet application, wherein the identifier is configured to imply a MIDlet application. The method includes requesting the non-MIDlet application and determining a type of the non-MIDlet application. Then, the non-MIDlet application is managed accordingly to an interface the application follows.

In another embodiment, a computer readable medium having program instructions for delivering non-MIDlet application to a device associated with a connected device configuration (CDC) through an over the air (OTA) mobile information device profile (MIDP) protocol is provided. The computer readable medium includes program instructions for prefixing an identifier for the non-MIDlet application, wherein the identifier is configured to imply a MIDlet application. Program instructions for requesting the non-MIDlet application and program instructions for determining a type of the non-MIDlet application are included. Program instructions for managing the non-MIDlet application accordingly to an interface the application follows are provided.

In yet another embodiment, a system configured to deliver non-MIDlet applications through an over the air (OTA) mobile information device profile (MIDP) protocol is provided. The system includes a server enabling access to a non-MIDlet type application and a client in communication with the server through a mobile information device profile (MIDP). The client is configured to download the non-MIDlet type application through the server. The client is further configured to store a descriptor associated with the non-MIDlet type application. The descriptor is configured to identify an address associated with the non-MIDlet application and describe executables associated with the non-MIDlet type application. The client includes an application manager configured to manage the non-MIDlet type application. The application manager is further configured to classify the non-MIDlet type application as one of an Xlet and an applet.

In still yet another embodiment, a device configured to download a non-MIDlet application through a mobile information device profile (MIDP) is provided. The device includes a repository of application files and an application manager linked to the repository of application files. The application manager is configured to decipher whether the non-MIDlet application is one of an Xlet and an applet through examination of a class data stored in the applications file. The descriptor is stored in the repository of application files.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for a method for provisioning services. Generally, embodiments of the present invention provide a method and system for providing Xlet and applet applications to CDC enabled devices. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments described herein use the Over The Air (OTA) User Initiated Provisioning Recommenced Practice designed for the Mobile Information Devices Profile (MIDP) for the purposes of provisioning Xlet and applet applications to devices running Personal Profile (PP). Of course, the MIDP devices for which OTA is generally used for is based on a Connected Limited Device Configuration (CLDC) as opposed to the PP device proposed here which would be based on the Connected Device Configuration (CDC) platform. OTA/MIDP is normally used to provision applications whose life cycle can be managed. These applications are referred to as MIDlets and must implement the MIDlet Interface. A CDC/PP enabled device cannot support MIDlets directly, therefore, the embodiments described below provision Xlets to CDC/PP devices, since these applications implement a similar life cycle interface. The OTA protocol and content specification should be applicable, regardless of the client device platform and the content delivered as long as the provisioning application on the client implements OTA.

The advantage of using OTA in this manner is that any existing OTA/MIDP enabled provisioning server could be used to provision Xlet applications to CDC/PP devices, thus enabling application provisioning to a new class of device. It should be appreciated that the module on the server (also known as a Provisioning Adaptor), responsible for receiving, processing and sending information to the device, would not need to be modified in order to provision to a new class of devices as long as the client implements the OTA specification. For simplification, the management and/or provisioning application are referred to herein as the same entity.

Figure 1:
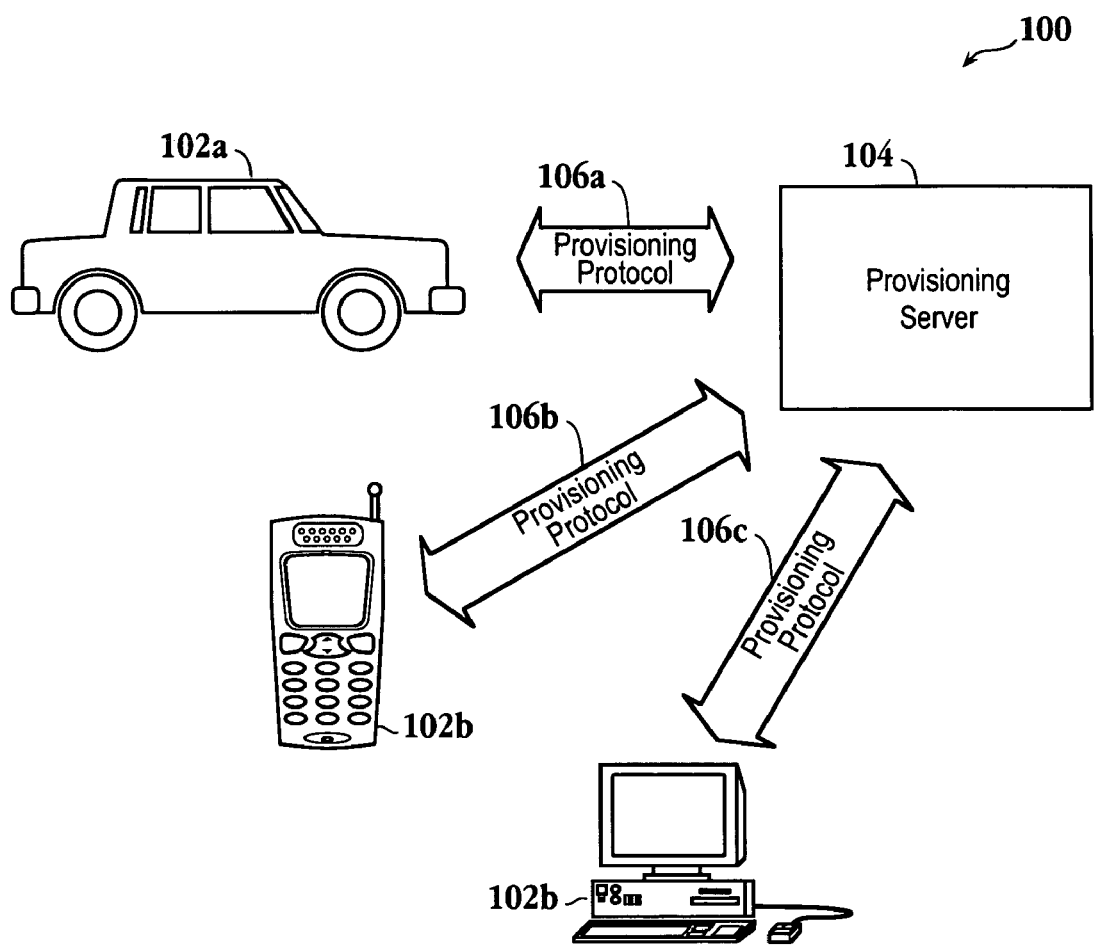
FIG. 1 is an illustration showing a provisioning system 100 using a provisioning application programming interface (API), in accordance with an embodiment of the present invention.

FIG. 1 is an illustration showing a provisioning system 100 using a provisioning application programming interface (API), in accordance with an embodiment of the present invention. The provisioning system 100 includes a plurality of client devices 102a-102c in digital communication with a provisioning server 104. The client devices 102a-102c can be any type of digital computing device, such as telematics client devices 102a in automobiles, mobile phones 102b, a desktop computers 102c, or any other type of client device capable of communicating with the provisioning server 104. Each client device 102a-102c is capable of establishing a network connection, which can be a wired connection or wireless connection, to the provisioning server 104. In addition, each client device 102a-102c may be intermittently ON or OFF, and intermittently connected to the network when the client device 102a-102c is ON.

Similar to above, the provisioning server 104 is a network resource from which the client devices 102a-102c can obtain access to new digital services and update existing digital services. The provisioning server 104 includes a plurality of provisioning adapters modules 106a-106c, which facilitate communication between the client devices 102a-102c and a provisioning application. The provisioning application is a generic and device independent application that includes the business logic for the provisioning system 100. In use, the provisioning application receives and provides commands to the provisioning API, which facilitates communication with the provisioning adapters 106a-106c.

The provisioning server 104 is a highly available network resource that can be embodied on a single computer or on a plurality of computers. For example, to increase availability, scalability, and manageability, the provisioning server 104 can be embodied on a collection of tightly coupled computers. However, from the point of view of the client devices 102a-102c, the provisioning server 104 generally appears as a single logical entity.

Broadly speaking, the provisioning server 104 provides discovery functionality allowing a user of a client device 102a-102c to discover services and contents that are available to the particular client device. Subscription functionality is provided by allowing a user of a client device 102a-102c to manage the content of services directories, described in greater detail below. The provisioning server's 104 delivery functionality allows a client device 102a-102c to receive content that has become available to the device or content that should be removed from the device. In addition, delivery functionality allows a client device 102a-102c to download available content.

Each provisioning adapter 106a-106c is designed to communicate with a specific client device, and "translate" or "map" the client device communication into a form specified by the provisioning API. For example, provisioning adapter 106a can be designed to communicate with the telematics client device 102a. In this case, the provisioning adapter 106a receives commands from the telematics client device 102a and translates the received commands into commands acceptable by the provisioning API. Similarly, the provisioning adapter 106b receives and translates commands from the mobile phone client device 102b, and the provisioning adapter 106c receives and translates commands from the desktop computer client device 102c.

As can appreciated, each provisioning adapter 106a-106c also facilitates command and content delivery from the provisioning API to each client device 102a-102c. That is, the provisioning adapter 106a receives commands from the provisioning API and translates the received commands into commands acceptable by the telematics client device 102a. Similarly, the provisioning adapter 106b receives and translates commands from provisioning API and delivers them to the mobile phone client device 102b, and the provisioning adapter 106c receives and translates commands for delivery to the desktop computer client device 102c.

The provisioning API defines several specific roles a provisioning adapter 106a-106c may play with respect to the provisioning application. More specifically, the provisioning API defines a common set of abstractions for sharing information between the provisioning adapters 106a-106c and the provisioning application. In addition, the provisioning API of the embodiments of the present invention defines a precise set of adapter/application interactions, which allow the mapping of a wide range of client specific provisioning models to a generic provisioning application.

In this manner, the provisioning API supports provisioning models where the provisioning server 104 plays a central role in managing which services and content are accessible and delivered to each client device 102a-102c. This is important, for example, in fleet management. For example, a corporation may deploy a large population of client devices 102a-102c, but want to retain strict control over the software configuration of each client device 102a-102c. It should be noted that the method for provisioning services of the embodiments of the present invention can be implemented in a plurality of manners, of which the provisioning API is one.

As mentioned above, the provisioning server 104 provides services and content to client devices 102a-102c. As used herein, a service is defined as a collection of one or more downloadable content files that are installed on a client device 102a-102c in order to provide the user of the client device with a particular functionality. Services can also be utilized to customize the user experience of existing functionality present on the client device. A content file can be an executable file, media files, property files, archive files, or any other file that may be required to provide a particular functionality on a client device. For example, exemplary content files can be executable Java byte code files, sound files, a video files, and image files. Services provide a product-level view of content that is usable by client device users, while individual content files represent a resource-level view that may or may not be exposed to the client device user.

In addition to individual services, embodiments of the present invention also process service directories. A service directory is an identifiable collection of services. A service directory also can be associated with a collection of nested service directories. In use, service directories can be defined for a plurality of administrative purposes. For example, a service directory can be utilized for presentation and navigation of service categories, and tracking of subscriptions and service deployment. Generally, the provisioning application manages the content of a service directory. For example, the provisioning application can manipulate a service directory as a result of a dynamic calculation or using a database representation.

A bundle is defined as a physical downloadable component. Bundles are parts of services, and are generally used during delivery. When a service is being delivered to a client device, all the required bundles corresponding to that service are downloaded to the client device. In one embodiment, a bundle includes two parts, a descriptor file and an actual content file. Generally these parts may be downloaded separately, however, the descriptive information for each bundle in a service can also be aggregated in the service description (service object). A bundle can also include a URL property, which is utilized for downloading.

In one embodiment, client objects can be utilized to store specific client device data during calls to the provisioning application. In this embodiment, when an adapter 106a-106c calls the provisioning application, the adapter provides a client device object along with the request. The client device object can be utilized to store information specific to that particular call, and will be returned "as is" to the adapter 106a-106c in the reply to the call. In this manner, an adapter 106a-106c can retrieve the stored information upon receiving the reply, which may be needed when the adapter instance that sent the request is not the same adapter instance that receives the reply from the provisioning application.

New classes of devices, e.g., smart cellular telephones, pagers and PDA's are proliferating at a high rate, while traditional consumer electronics which include televisions, VCR's, CD players and game machines are also becoming smarter and gaining new capabilities. Irrespective of whether these devices are new or just more powerful versions of existing products, all are becoming increasingly interconnected across a network.

Figure 2:
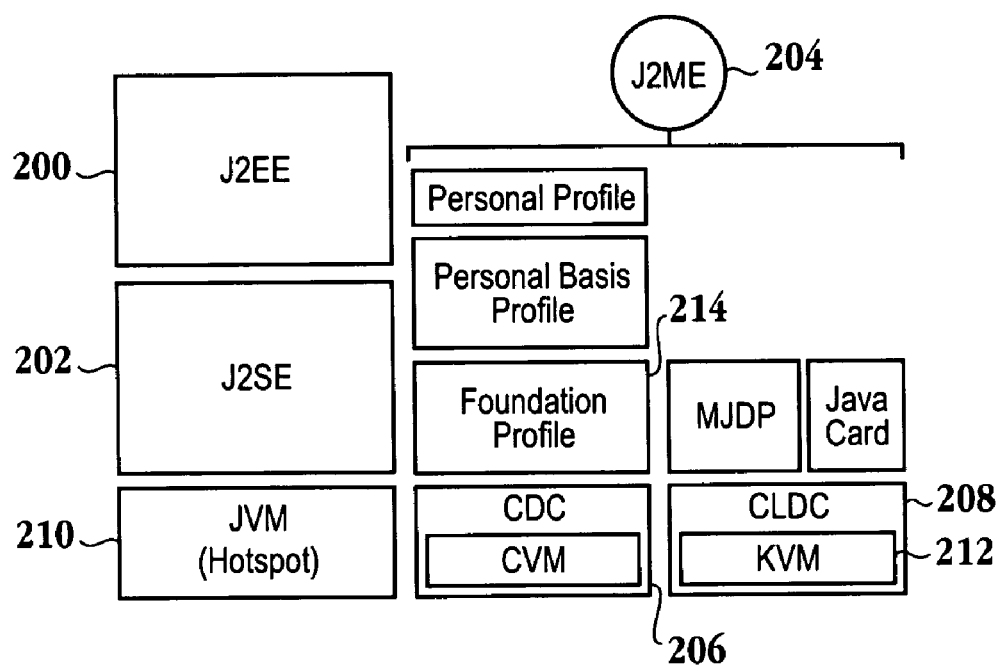
FIG. 2 is a simplified schematic diagram of the JAVA 2 platform technology.

FIG. 2 is a simplified schematic diagram of the JAVA 2 platform technology. The JAVA platform has become essential for getting work done on the network. The JAVA 2 platform enterprise edition (J2EE) 200 defines the standard for developing multi-tier enterprise applications. J2EE simplifies enterprise applications by basing them on standardized, modular components, by providing a complete set of services to those components, and by handling many details of application behavior automatically, without complex programming. The JAVA 2 platform, standard edition, is at the core of JAVA technology. From client to server, from desktop to supercomputer, improvements have been made to the JAVA 2 platform standard edition (J2SE) 202. The J2EE and J2SE run on top of JAVA virtual machine (JVM) 210. The J2SE platform is not targeted at consumer electronic devices or automotive systems. However, with the advent of personalJAVA embeddedJAVA, and other JAVA technologies, the benefits of the JAVA platform are being extended to screen phones, set top boxes, autotelematic systems, and even deeply imbedded devices. For these applications, JAVA2 platform microedition (J2ME) 204 software is available. J2ME 204 is a smaller JAVA application environment suitable for consumer electronic devices, e.g., hand-held devices and household appliances.

Currently, there are two J2ME configurations: the connected limited device configuration (CLDC) 212 and the connected device configuration (CDC) 206. CDC 206 is the J2ME configuration for devices with relatively larger memory, typically 2 megabytes or more. CDC 206 targets devices with limited and intermittent wireless connectivity. CDC 206, together with C virtual machine (CVM) and the foundation profile 214 defines the complete J2ME environment.

CLDC 208 is a J2ME configuration for devices with typically less than 512 kilobyte memory footprints available for JAVA environment and applications. CLDC is for the kilobyte virtual machine (KVM) 212. KVM 212 is a highly optimized JAVA virtual machine meant for lower end, network connected or connectionless, battery operated devices based on 16 bit or 32 bit microprocessors with around 160 to 5012 kilobytes memory available for JAVA.

Figure 3:
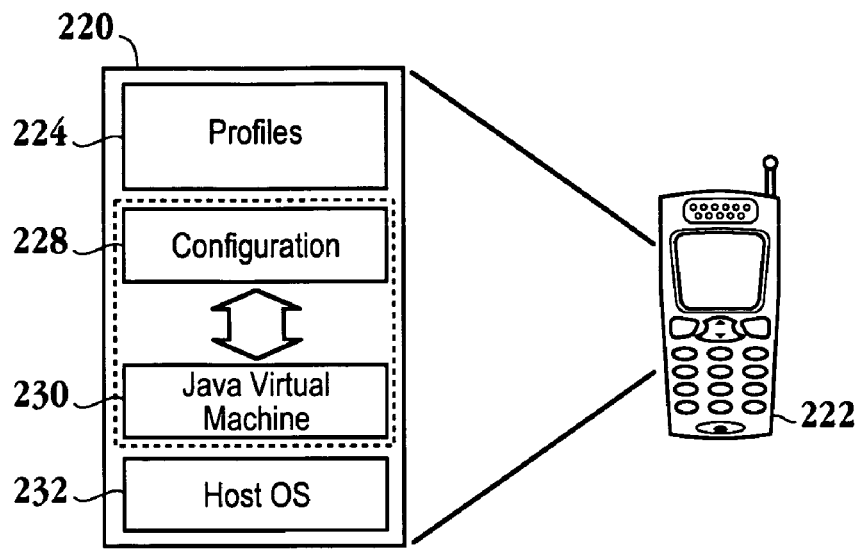
FIG. 3 is a simplified schematic diagram illustrating the modular architecture of the JAVA2 microedition.

FIG. 3 is a simplified schematic diagram illustrating the modular architecture of the JAVA2 microedition. J2ME is built around a modular architecture illustrated in box 220. The modular architecture includes profiles 224, configurations 228 which runs on top of the JAVA virtual machine 230, and host operating systems 232. These pieces provide functionality enabled through the consumer electronic or handheld device such as cell phone 222. It should be appreciated that a configuration specifies the minimum set of features and JAVA class libraries that the associated JAVA virtual machine should support. Conceptually, the configuration layer runs on top of the virtual machine, however, one skilled in the art will appreciate that when using a configuration it includes the associated virtual machine as well, because the two are closely linked. Built into the core platform is the capability to receive not just application code, but libraries that form part of the JAVA 2 platform itself. This enables a J2ME environment to be dynamically configured to provide the environment that the consumer needs to run an application, irrespective of whether all the JAVA technology-based libraries necessary to run the application are present on the device. In one embodiment, the configuration is performed by server software running on the network.

Figure 4:
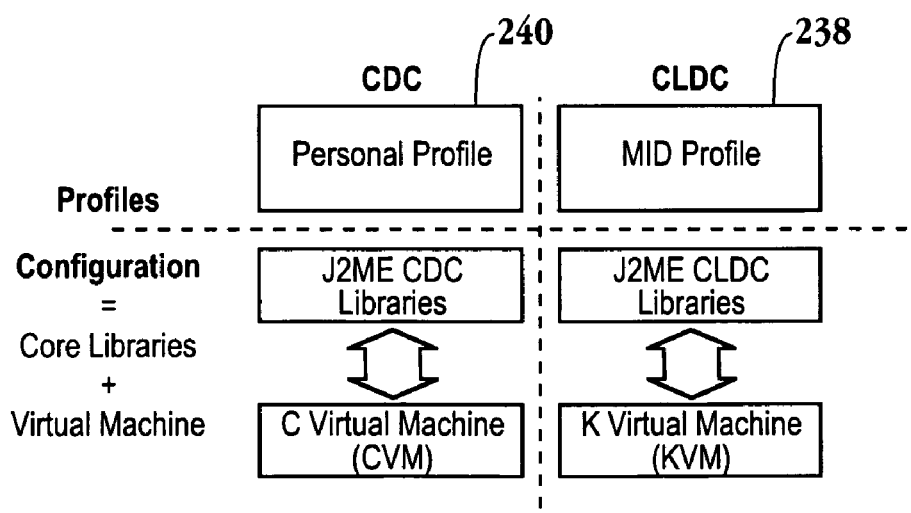
FIG. 4 illustrates two exemplary configurations available for the J2ME.

FIG. 4 illustrates two exemplary configurations available for the J2ME. As mentioned above, CDC is a J2ME configuration for devices with relatively larger memory. As can be seen in FIG. 4 each configuration includes profiles which run on top of a virtual machine. It should be appreciated that a profile defines a set of application programming interfaces (API) available for a particular family of devices. For example, the profile for a cell phone may be separate for the profile of a personal organizer, however, both profiles may work with the same configuration as illustrated in FIG. 4. A profile targeted at the wireless market and utilizing CLDC can retain a very small footprint, consume little power, and provide as much capability as is needed for hand-held devices. For example, the mobile information device profile (MIDP) combined with the CLDC, is the JAVA run time environment for many mobile information devices such as phones and entry level PDA. MIDP 238 defines a platform for dynamically and securely delivering highly graphical common networked applications to mobile information devices. The core application functionality required by mobile applications is provided through a standardized JAVA run time environment in set of JAVA API's.

Using MIDP, developers can write applications that are optimized for today's mobile information devices. MDP is supported by leading JAVA technology integrated development environments (IDEs). To download a MIDP application, the user browses a list of applications stored on a web server. Once the application is selected, the device checks to make sure it can run the application. If the device can run the application, the device downloads the application and then verifies and executes the JAVA byte code to run on the device. Once installed, MIDP applications can be easily updated and removed by the user. It should be appreciated that the graphical user interface for an MIDP application is optimized for the small display size, input methods and other native features of mobile devices. MIDP provides intuitive navigation and data entry by fully leveraging the phone keypads, extra buttons such as arrow keys, touch screens and small upper QWERTY keyboards. MIDP applications are called MIDlets. It should be further appreciated that the MDP specification addresses issues such as user interface, persistent storage, networking, and application model.

Still referring to FIG. 4 in a CDC environment a personal profile configuration is supported. The personal profile combined with CDC provides a JAVA application environment for resource constrained devices that require application support. Exemplary products incorporating personal profile include high end PDA's and embedded web browsers. It should be appreciated that CLDC is configured to deliver MIDlets through the MIDP over the air (OTA) standard, which does not support the delivery of applets or Xlets. Thus, as some of the smaller devices associated with CLDC configurations become more powerful, it may be desirable to deliver Xlets and applets to these devices through the MIDP protocol. Additionally, the delivery of Xlets and applets to CDC devices through MIDP OTA is likewise desirable. It should be appreciated that when delivering services/applications to a device, a user may type in an address (URL) which returns a list of available applications for device to download or use, where these applications are not installed on the device.

Figure 5:
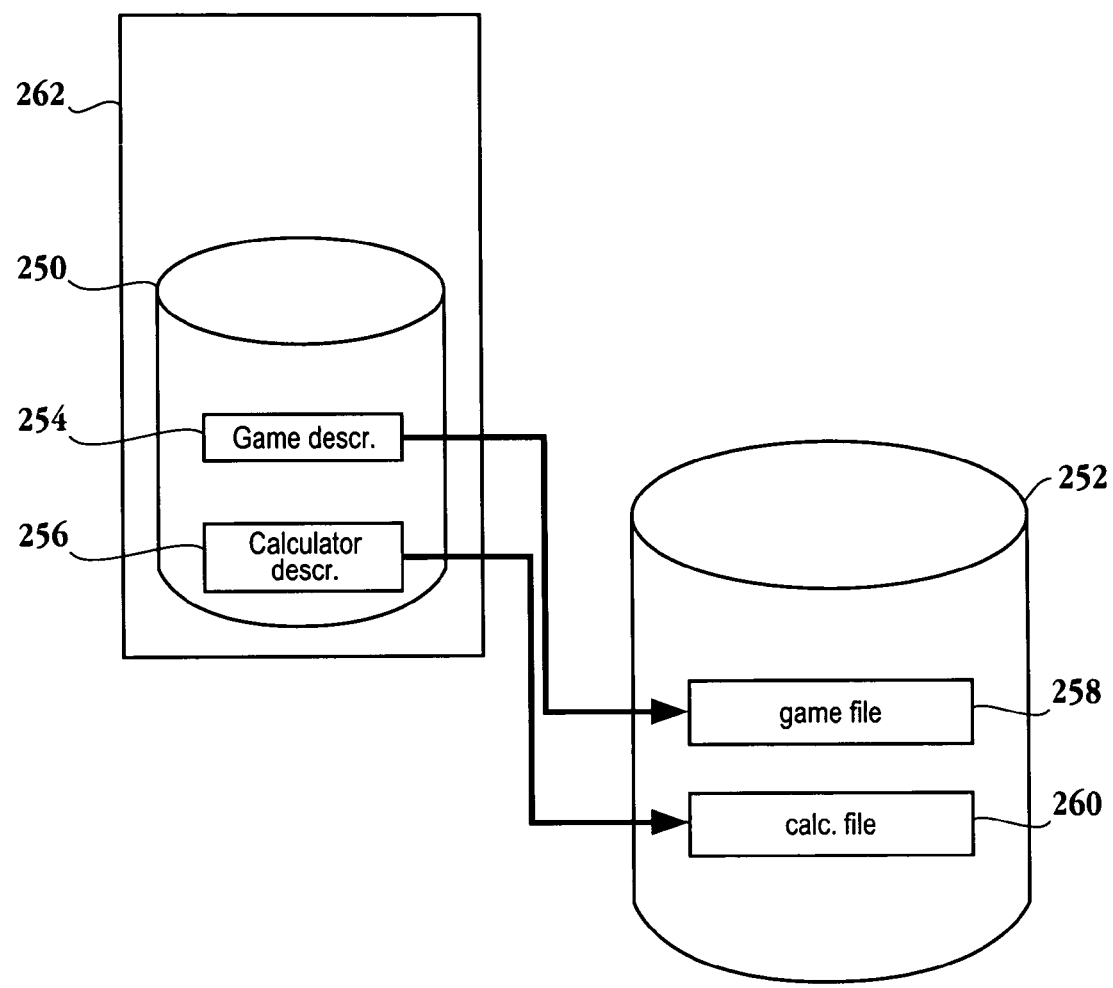
FIG. 5 is a simplified schematic illustrating an exemplary scheme for delivering services and applications to a device in accordance with one embodiment of the invention.

FIG. 5 is a simplified schematic illustrating an exemplary scheme for delivering services and applications to a device in accordance with one embodiment of the invention. Here, repository 250 which sits on a device 262 includes two exemplary descriptor files, game descriptor 254 and calculator 256. It should be appreciated that repository 250 may include any number of suitable descriptor files and is not limited to the two discussed herein. As used herein, a descriptor is a list of properties of an application describing the application. Thus, when a user selects a descriptor from repository 250, an address (URL) is used to access game file 258 which is externally located on storage 252. Alternatively, calculator file 260 may be accessed through calculator descriptor 256. As mentioned above under the MIDP protocol support is not available for Xlet and applet type applications. Thus, in order to obtain an Xlet and applet application files, over the MIDP protocol the applet or Xlet application must be prefixed in order to be able to be downloaded through the MIDP protocol. That is, the Xlet or applet is prefixed in order to appear as a MIDlet.

It should be appreciated that some of the descriptor names used in the OTA/MIDP specification are inappropriate for Xlets, given that they specifically include the term MIDlet. However, there is basically a one to one correspondence from MIDlet to Xlet. Thus, the terminology may be confusing in the context of an Xlet, but functionally this terminology can be used. The OTA/MIDP specification implies a provisioned application type by prefixing names of property keys with 'MID'. One of the properties of a provisioned application is the executable class name that should conform to the MIDlet API. If the application provisioned, is actually one or more Xlets, the class, or classes, should conform to an Xlet API instead, for a target device that is CDC/PP enabled. One skilled in the art will appreciated that since the OTA/MIDP specification does not enforce any rules on the content provisioned, as long as a device knows how to handle the content, it's up to device to decided how to execute the content delivered.

Figure 6:
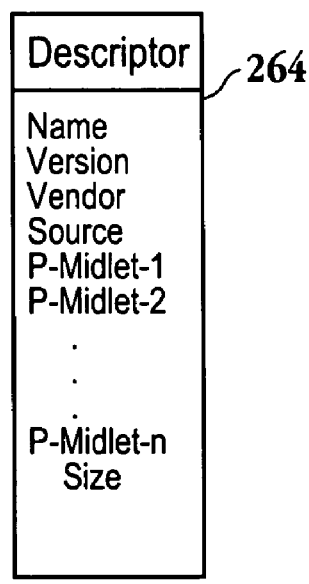
FIG. 6 is an exemplary configuration for a descriptor in accordance with one embodiment of the invention.

FIG. 6 is an exemplary configuration for a descriptor in accordance with one embodiment of the invention. Descriptor 264 includes text information and a link to a file containing the application associated with the descriptor. Descriptor 264 includes information such as a name, a version, a vendor, and a source. It should be appreciated that the source may include information on where to download the associated application from, i.e., a URL address. Additionally, descriptor 264 includes prefixed MIDlets 1 through prefix MIDlet n, which correspond to an applet or Xlet. It should be further appreciated that the prefixed MIDlets of descriptor 264 describe executables associated with the file. Descriptor 264 also includes size information.

Figure 7:
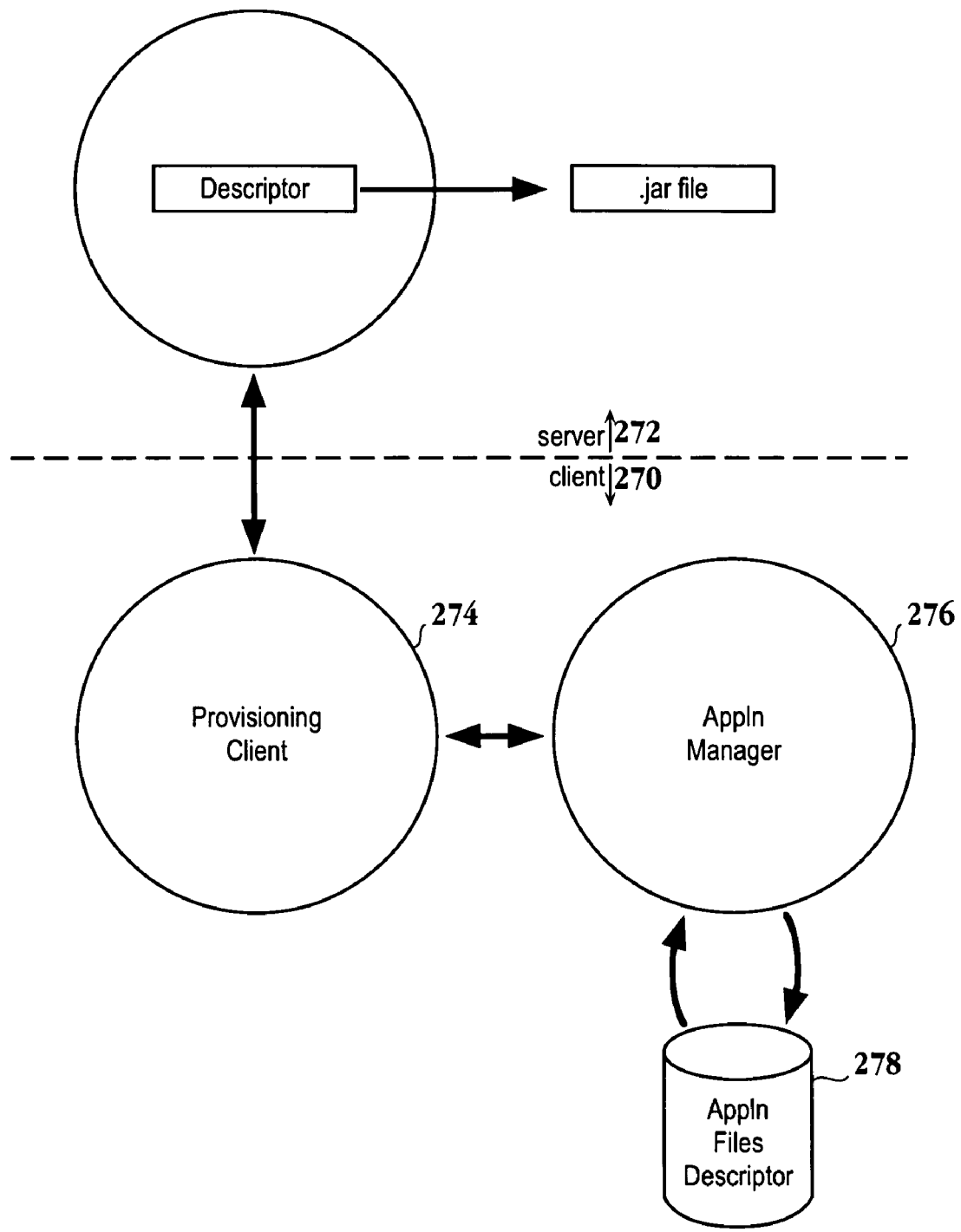
FIG. 7 is a simplified schematic diagram showing a server client relationship incorporating descriptor files in accordance with one embodiment of the invention.

FIG. 7 is a simplified schematic diagram showing a server client relationship incorporating descriptor files in accordance with one embodiment of the invention. Here, client 270 includes provisioning client 274 in communication with application manager 276. Application manager 276 is in communication with repository 278. Repository 278 stores application files and descriptor files which may be accessed by application manager 276. Provisioning client 274 is in communication with server 272. Server 272 includes a descriptor file having access to a jar file. It should be appreciated that if client 270 wishes to acquire an application not stored in repository 278, provisioning client 274 may obtain the application through server 272 as described herein while using the MDP OTA protocol. Thus, even though the MDP OTA protocol is configured to utilize MIDlets, by prefixing the Xlet or applet associated with the application to be acquired, the MIDP OTA protocol may be used for provisioning Xlet and applet type applications. Thus Xlets and applets may be provisioned to CDC/PP devices through the MIDP OTA protocol.

Figure 8:
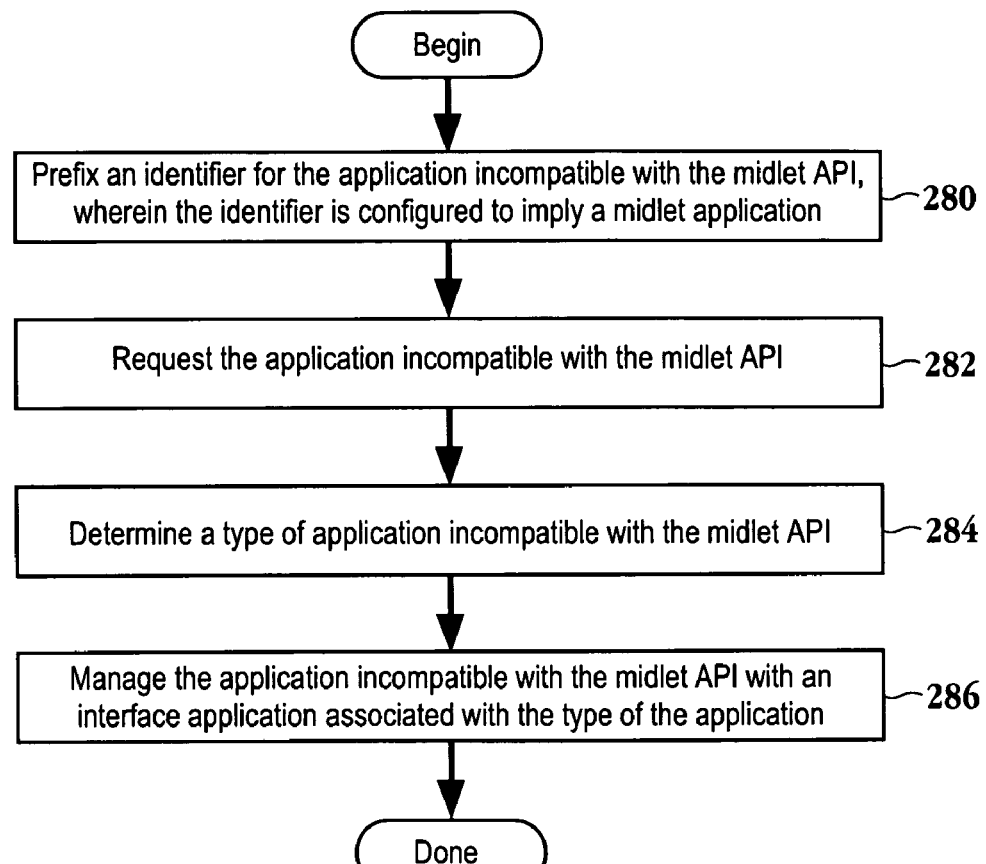
FIG. 8 is a flow chart diagram illustrating the method operations for delivering a non-MIDlet application to a device associated with a connected device configuration (CDC) through over-the-air (OTA) mobile information device profile (MIDP) protocol in accordance with one embodiment of the invention.

FIG. 8 is a flow chart diagram illustrating the method operations for delivering a non-MIDlet application to a device associated with a connected device configuration (CDC) through over-the-air (OTA) mobile information device profile (MIDP) protocol in accordance with one embodiment of the invention. The method initiates with operation 280 where an identifier for the application incompatible with the MIDlet API is prefixed to the Xlet or applet. Here, the identifier is configured to imply a MIDlet application, thereby providing the appearance that the Xlet or applet conforms to the MIDP protocol. As mentioned above, the names of the property keys may be prefixed with "MID" here. The method then advances to operation 282 where the Xlet or applet is requested. For example, a client wishing to obtain the Xlet or applet application may request the application from the server as discussed above with reference to FIG. 7. The method then proceeds to operation 284 where a type of the application is determined. Here, the type of application is either an applet or Xlet application type in accordance with one embodiment of the invention. It should be appreciated that a descriptor of the non-MIDlet application may be parsed in order to determine the type of application. The method then moves to operation 286 where the non-MIDlet application is managed with an interface application associated with the type of the application. For example, the Xlet or applet application type may be managed through a personal profile (PP) device which is based on a connected device configuration platform.

One skilled in the art will appreciate that an Xlet is an application or service designed to be run and controlled by an application manager via a life cycle interface. An Xlet must implement the example, starting, pausing, destroying, the Xlet application. An application manager can manage multiple Xlets within a runtime environment, by selecting which Xlets are active at any given time. The application manager maintains the state of the Xlet and invokes Xlet's state transition methods when appropriate. The Xlet implements these state transition methods to update its internal activities and resource usage as directed by the application manager. The discovery, installation, sending status reports, application update, execution and removal Xlets, can also be implemented without violating the OTA/MIDP specification. These are required OTA/MIDP functions of a management application residing on the client device. The above also applies to an applet.

Thus, the embodiments described herein enable the OTA/MIDP protocol, which is only intended to provision MIDlets to CLDC/MDP devices, to be used for provisioning Xlets and applets to CDC/PP based devices. Additionally, information for a developer on how to build an application on the client side to enable provisioning of Xlets and applets is provided. Functional requirements of the OTA/MIDP specification can be applied to CDC/PP enabled devices, since the CDC Foundation Profile (through PP) APIs include all the functionality provided by the CLDC MIDP APIs. Thus, all required functionality to implement the management application is available to the management application developer.

Furthermore, the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is: application.

1. A method executed by a microprocessor for delivering a non-MIDlet application to a device associated with a connected device configuration (CDC) through an over the air (OTA) mobile information device profile (MIDP) protocol, comprising:
   prefixing an identifier for the non-MIDlet application, wherein the identifier is configured to imply a MIDlet application and wherein the identifier is resident in memory of a computing device;
   requesting the non-MIDlet application;
   determining a type of the non-MIDlet application by parsing a descriptor of the non-Midlet application; and
   managing the non-MIDlet application with an interface the non-MIDlet application follows.

2. The method of claim 1, further comprising:
   downloading the non-MIDlet application.

3. The method of claim 1, wherein the non-MIDlet application is one of an Xlet and an applet.

4. The method of claim 1, wherein the method operation of prefixing an identifier for the non-MIDlet application includes,
   applying an "MID" prefix to names of property keys associated with the non-MIDlet application.

5. The method of claim 4, wherein "MID" implies the MIDlet application.

6. A computer readable medium having program instructions for delivering non-MIDlet applications to a device associated with a connected device configuration (CDC) through an over the air (OTA) mobile information device profile (MIDP) protocol, comprising:
   program instructions for prefixing an identifier for the non-MIDlet application, wherein the identifier is configured to imply a MIDlet application;
   program instructions for requesting the application incompatible with the MIDlet API;
   program instructions for determining a type of the non-MIDlet application through parsing a descriptor of the non-MIDlet application; and program instructions for managing the non-MIDlet application with an interface application associated with the type of the application.

7. The computer readable medium of claim 6, further comprising:

program instructions for downloading the non-MIDlet application.

8. The computer readable medium of claim 6, wherein the non-MIDlet application is one of an Xlet and an applet.

9. The computer readable medium of claim 6, wherein the program instructions for prefixing an identifier for the non-MIDlet application includes, program instructions for applying an "MID" prefix to names of property keys associated with the non-MIDlet application.

10. A system configured to deliver non-MIDlet applications through an over the air (OTA) mobile information device profile (MIDP) protocol, comprising:

a server enabling access to a non-MIDlet type application; and a client in communication with the server through a mobile information device profile (MIDP), the client configured to download the non-MIDlet type application through the server, the client further configured to store a descriptor associated with the non-MIDlet type application, the descriptor configured to identify an address associated with the non-MIDlet application and describe executables associated with the non-MIDlet type application, the client including, an application manager configured to manage the non-MIDlet type application, the application manager further configured to decipher whether the non-MIDlet type application is one of an Xlet and an applet through examination of a class data stored in an application file.

11. The system of claim 10, wherein the client communicates with the server through a distributed network through one of a wired connection and a wireless connection and wherein the client stores a repository of files that includes the descriptor, the application manager linked to the repository of files.

12. The system of claim 10, wherein the client supports a connected device configuration (CDC).

13. The system of claim 10 wherein the client is selected from the group consisting of a cellular phone, a pager, a household appliance, and a personal digital assistant.

14. A device configured to download a non-MIDlet application through a mobile information device profile (MIDP), wherein the device stores:

a repository of application files;

an application manager linked to the repository of application files, the application manager configured to decipher whether the non-MIDlet application is one of an Xlet and an applet through examination of a class data stored in the application file, a descriptor being stored in the repository of application files.

15. The device of claim 14, wherein the device is selected from the group consisting of a cellular phone, a pager, a household appliance, and a personal digital assistant.

16. The device of claim 14, wherein the non-MIDlet application is configured to appear as a MIDlet application to the MIDP through the incorporation of an "MID" prefix.

17. The device of claim 16, wherein the "MID" prefix is inserted prior to a name of a property key.

18. The device of claim 14, wherein the descriptor is a list of properties of the non-MIDlet application, the list of properties selected from the group consisting of a name, a version, a vendor, a source, and a size of the non-MIDlet application.

* * * * *